(12) United States Patent
Obr et al.

(10) Patent No.: US 8,683,145 B2
(45) Date of Patent: Mar. 25, 2014

(54) PACKED STORAGE COMMANDS AND STORAGE COMMAND STREAMS

(75) Inventors: Nathan Steven Obr, Bellevue, WA (US); Andrew Herron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 12/614,454

(22) Filed: Nov. 9, 2009

(65) Prior Publication Data

US 2011/0113213 A1 May 12, 2011

(51) Int. Cl.
*G06F 12/02* (2006.01)

(52) U.S. Cl.
USPC .............. 711/154; 711/165; 711/E12.002; 710/5

(58) Field of Classification Search
None
See application file for complete search history.

(56) References Cited

U.S. PATENT DOCUMENTS

| | | | |
|---|---|---|---|
| 4,868,734 A * | 9/1989 | Idleman et al. ....... | 711/E12.019 |
| 6,009,515 A * | 12/1999 | Steele, Jr. ............... | 712/244 |
| 6,483,804 B1 | 11/2002 | Muller et al. | |
| 6,675,177 B1 * | 1/2004 | Webb ........................ | 711/1 |
| 6,779,045 B2 | 8/2004 | Kendall et al. | |
| 7,013,379 B1 | 3/2006 | Testardi | |
| 7,310,711 B2 | 12/2007 | New et al. | |
| 7,552,294 B1 | 6/2009 | Justiss | |
| 2003/0009477 A1 * | 1/2003 | Wilding et al. ............ | 707/104.1 |
| 2003/0231855 A1 * | 12/2003 | Gates et al. ..................... | 386/46 |
| 2004/0210725 A1 * | 10/2004 | DeRoo et al. ................. | 711/154 |
| 2005/0251630 A1 * | 11/2005 | Matthews et al. ............. | 711/138 |
| 2006/0190510 A1 * | 8/2006 | Gabryjelski et al. .......... | 707/206 |
| 2007/0033433 A1 * | 2/2007 | Pecone et al. ..................... | 714/6 |
| 2007/0050592 A1 * | 3/2007 | Gschwind et al. ............ | 711/201 |
| 2008/0002578 A1 * | 1/2008 | Coffman et al. .............. | 370/230 |
| 2008/0162753 A1 | 7/2008 | Liu et al. | |
| 2008/0263259 A1 | 10/2008 | Sadovsky et al. | |

OTHER PUBLICATIONS

Thakur, et al. , "Data sieving and collective I/O in ROMIO,", Retrieved at <<http://eprints.kfupm.edu.sa/33409/1/33409.pdf>>, Appeared in Proc. of the 7th Symposium on the Frontiers of Massively Parallel Computation, Feb. 1999, IEEE, pp. 182-189.

Dickens, et al. , "A Performance Study of Two-Phase I/O,", Retrieved at <<http://citeseerx.ist.psu.edu/viewdoc/download?doi=10.1.1.36. 1561&rep=rep1&type=pdf>>, Sep. 4, 1998, pp. 6.

(Continued)

*Primary Examiner* — Michael Krofcheck
(74) *Attorney, Agent, or Firm* — Tony Azure; Andrew Sanders; Micky Minhas

(57) ABSTRACT

A packed command can be received at a storage device. The packed command can include an indicator of a source data location in the storage device and an indicator of a destination data location in the storage device. In response to receiving the packed command, a storage map table in the storage device can be updated. Also, a storage processing guide can be sent to a storage device. The processing guide can include a stream indicator associating the processing guide with a storage command stream. A set of storage commands can also be sent to the storage device. One or more of the commands in the set can each include a stream indicator that matches the stream indicator in the processing guide and identifies the command with the stream.

20 Claims, 7 Drawing Sheets

(56) References Cited

OTHER PUBLICATIONS

Singhal, et al., "Atomic Read Modify Write Primitives for I/O Devices.", Retrieved at <<http://download.intel.com/technology/pciexpress/devnet/docs/08-492_Atomic_WP_FIN_hires.pdf>>, Aug. 2008, pp. 8.

Melvin, et al., "A Massively Multithreaded Packet Processor.", Retrieved at <<http://www.zytek.com/~melvin/melvin-np2a.pdf>>, Presented at NP2: Workshop on Network Processors, held in conjunction with The 9th International Symposium on High-Performance Computer, Architecture, Anaheim, California, Feb. 8-9, 2003. pp. 11.

Carney, et al., "Operator Scheduling in a Data Stream Manager.", Retrieved at <<http://www.cs.brown.edu/research/aurora/vldb03_scheduler.pdf>>, Proceedings of the 29th VLDB Conference,Berlin, Germany, Sep. 12, 2003, pp. 12.

"MPEG Transport Stream—TS Definition and Diagram.", Retrieved at http://www.iptvdictionary.com/iptv_dictionary_MPEG_Transport_Stream_TS_definition.html>>, Aug. 25, 2009, pp. 2.

\* cited by examiner

PACKED STORAGE COMMANDS AND STORAGE COMMAND STREAMS

BACKGROUND

Data storage commands often originate in applications that either make incorrect assumptions or are limited in their ability to make assumptions about the behavior or limitations of the underlying hardware and storage busses that hold the applications' data. These data storage commands are often decomposed into a series of hardware media commands that are interwoven with other hardware media commands over a period of time and passed to storage devices. As used herein, data storage commands are commands that request some operation on stored data. Examples of data storage commands include, but are not limited to, read commands, write commands, etc. A hardware media command is a type of data storage command that requests an operation on hardware storage media at either a source data location or a destination data location, but not both. Examples of hardware media commands include reading data from the media, writing data to the media, and finalizing data that has been written to the media. As an example of decomposition of a data storage command into hardware media commands, a copy storage operation may be decomposed into access hardware media commands that requests existing data from a source data location in a storage device, a write hardware media command that requests the storage device to write the data to a destination data location in the storage device, and another access hardware media command that requests the storage device to finalize the data written to the permanent media. Other related or unrelated hardware media commands may be interwoven between these three commands in ways that are unknown to the application and often unknown to the underlying operating system.

SUMMARY

Whatever the advantages of previous storage tools and techniques, they have neither recognized the packed storage command and storage command stream tools and techniques described and claimed herein, nor the advantages produced by such tools and techniques.

In one embodiment, the tools and techniques can include receiving a packed command at a storage device. As used herein, a packed command is a command that indicates a data source data location and a data destination data location. The source and destination data locations may be expressed in different ways and may be translated between different namespaces in different levels of a computing system. For example, source data locations and destination data locations may be expressed in terms of directories and filenames, in terms of logical block addresses, in terms of physical block addresses, etc. The packed command may also indicate an operation to be performed on data between the source and destination data locations, or such an operation may be implied (e.g., from the context of the command or from default settings). For example, a packed copy command can request that data be copied from the source data location to the destination data location, a packed move command can request that data be moved from the source data location to the destination data location, and a packed soft link command can request that an additional storage map table entry link to the data. Other packed commands could also be used, such as packed compression commands, packed encryption commands, and packed RAID p and q calculation commands. In response to receiving the packed command at the storage device, a storage map table in the storage device can be updated. The term storage map table is used herein broadly to refer to any data structure that associates logical location addresses to physical media locations. In addition to storage map table updating, other operations may also be performed in response to the command. For example, these other operations could include reading stored data from the source data location, writing data to new physical locations, etc.

In another embodiment of the tools and techniques, a processing guide can be sent to a storage device. The processing guide can include a stream indicator associating the processing guide with a storage command stream. As used herein, a processing guide is a set of information, which requests that one or more storage commands be processed in a particular way. A stream is an identified set of one or more storage commands, which can be a subset of commands sent to a storage device. One or more of the commands in the set can include a stream indicator that matches the stream indicator in the processing guide and identifies the command with the stream. As used herein, one stream indicator matches another if the two stream indicators can be identified with each other (and with the associated stream) by comparing the indicators, and possibly by performing some calculations on the indicators, but without reference to the positions or order of the commands and guides as they are transmitted to the storage device.

As an example, a processing guide may be a flush processing guide that identifies a subset of storage commands sent to a storage device to be flushed to permanent storage. For example, the subset may be all pending write operations (e.g., simple write operations, packed commands including write operations, etc.) identified with one or more streams.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
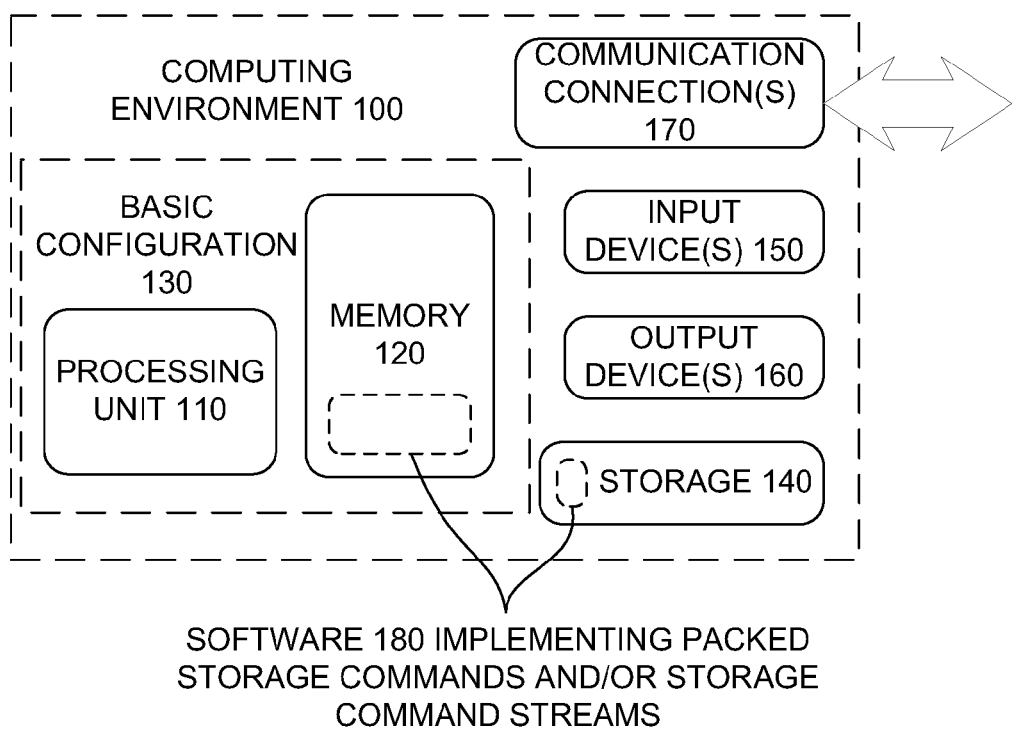
FIG. 1 is a block diagram of a suitable computing environment in which one or more of the described embodiments may be implemented.

Embodiments described herein are directed to improved data storage techniques and tools. Such improvements may result from the use of various techniques and tools separately or in combination.

Such techniques and tools may include using packed storage commands that each indicate a data source data location, a data destination data location, and typically an operation to perform on the data (e.g., copy, move, soft link, etc.). This packing of what could have been multiple hardware media operations into a single command can decrease the overhead associated with sending multiple commands to a storage device (potentially including data to be stored), and receiving multiple responses (potentially including stored data). Instead of having multiple "roundtrips" across a storage bus and other computing components, the packed command can be sent to the storage device, the device can perform the requested operation (which can include updating a storage map table), and a single response can be sent back from the storage device.

In addition to overhead for roundtrips to and from storage devices, there are risks associated with data modification operations. Such risks can result in errors that applications and even storage subsystem software often assume is not possible. Examples of such errors include torn writes (where a failure occurs when only part of a write has completed) and delayed write errors (where a failure occurs when a component has responded as if a write occurred, but the write is being delayed—such as in a lazy write technique). The techniques and tools described herein can include identifying streams of storage commands sent to a storage device, and sending processing guides to control the way that one or more particular streams are processed. For example, an application or operating system can use processing guides and streams to dictate dependencies between storage commands in the streams, to dictate the order in which storage commands in a stream are processed, and/or to otherwise dictate the timing of processing storage commands in a stream. By dictating dependencies, timing, and/or ordering of commands some errors such as torn writes and delayed write errors may be avoided.

Accordingly, one or more substantial benefits can be realized from the tools and techniques described herein. For example, a packed command may decrease the number of direct memory access operations performed, which may or may not include transfer across a storage bus. Operation improvements may also come from lessening error handling needed when one of a series of simple commands fails, leaving a complex operation in an inconsistent state. By sending a packed command, the device can handle all or none of the operations requested by the packed command, so that even if the packed command fails, it can fail atomically. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems or environments described herein and/or with one or more other systems or environments. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an environment for implementing packed storage commands and/or storage command streams. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing packed storage commands and storage command streams.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. In addition, some input and output devices, such as network adapters, may also be considered communications connections. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter (which may also facilitate communication connection(s) (170)); a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Packed Storage Commands and Storage Command Streams System and Environment

An example of a suitable computing storage environment will now be discussed with reference to FIG. 2. The operation of the storage environment with packed storage commands and storage command streams will then be discussed.

A. Storage Environment

Figure 2:
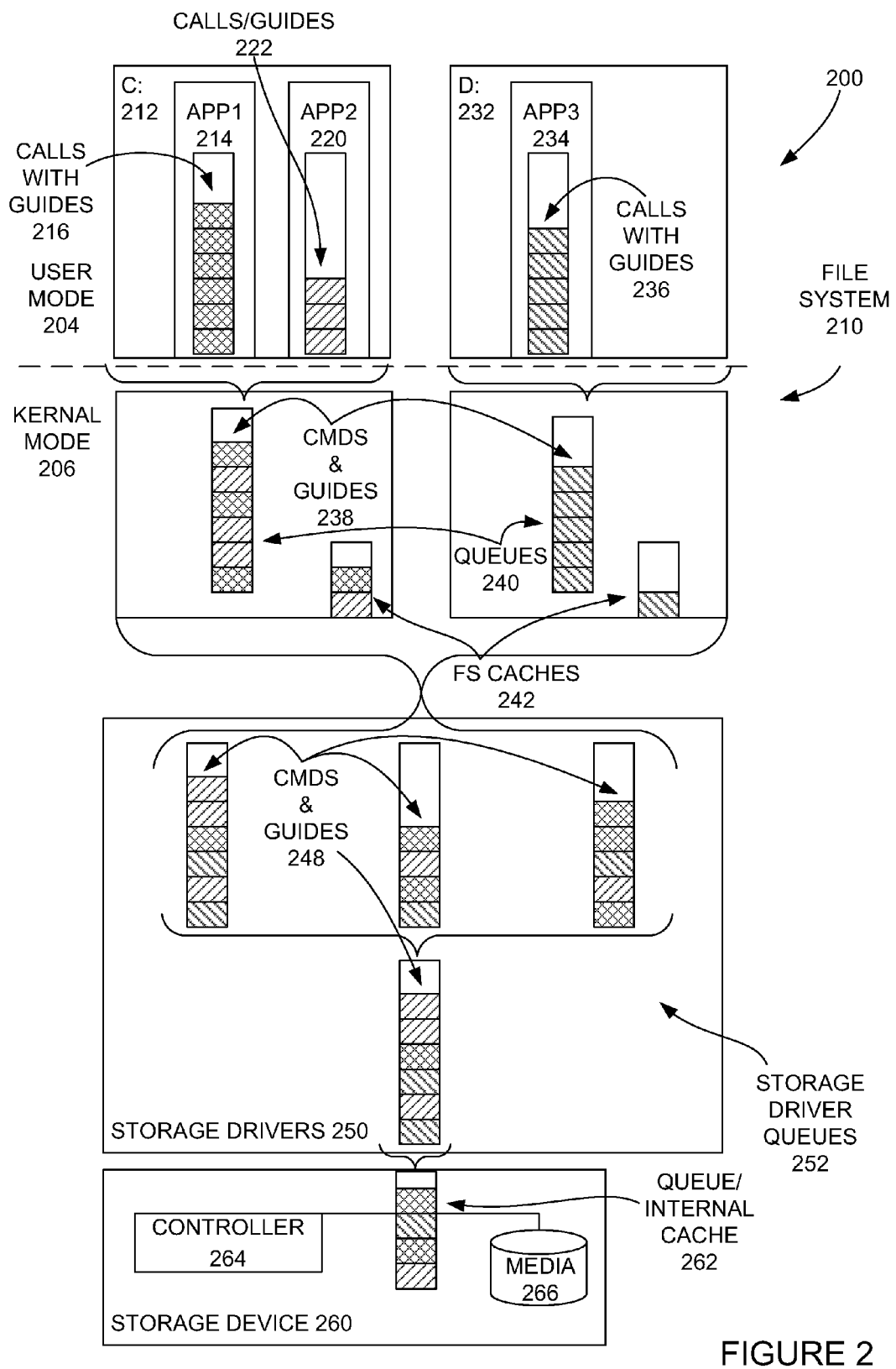
FIG. 2 is schematic diagram of a storage environment.

FIG. 2 is a simplified block diagram of a computing storage environment (200) in conjunction with which packed storage commands and storage command streams may be implemented. The storage environment (200) of FIG. 2 is simplified to focus on the treatment of storage commands and related information as they pass from an application to a storage device. Some storage commands may be passed to storage devices in some other manner. For example, some commands may originate in the file system (210).

The storage environment (200) can include some instructions (e.g., applications) executing in a user mode (204), and others (e.g., a file system kernel) executing in a kernel mode (206). A file system (210) can execute primarily in kernel mode, which can provide the file system (210) with access to resources to perform typical file system tasks. In a first logical storage environment (212) (which can be a storage volume associated with a physical backing store, as discussed below), such as a virtual environment or some other storage environment configured to store application information in a logical drive (labeled C: in FIG. 2), a first application (214) can be running in user mode (204). The first application (214) can perform file operations such as by making application programming interface function calls (216) to the file system (210). A second application (220) can also be running in the first logical storage environment (212) in user mode (204), and can perform file operations such as by making application programming interface function calls (222) to the file system (210). Moreover, in a second logical storage environment (232), a third application (234) can be running in user mode (204), and can perform file operations such as by making application programming interface function calls (236) to the file system (210). The function calls (216, 222, and 236) can include processing guides generated by the respective applications (214, 220, and 234), such as by making separate processing guide function calls or by specifying processing guides within the storage function calls. The function calls (216, 222, and 236) can be held in queues as they are passed out of the applications (214, 220, and 234), and to the file system (210).

The file system (210) can receive the functions calls (216, 222, and 236), and create corresponding volume storage commands (238). The volume storage commands (238) can include processing guides that are interspersed with, or part of, the commands (238), such as processing guides specified in the function calls (216, 222, and 236)). The file system (210), volume manager, and/or other component(s) may also create their own storage commands and processing guides (238) in addition to or instead of the processing guides and commands specified in the function calls (216, 222, and 236) from the applications (214, 220, and 234). In FIG. 2, commands and guides (238) from a particular application (214, 220, or 234) are illustrated with the same cross hatching as function calls from the same application. In creating the storage commands (238), the file system (210) can translate targets from the function calls (216, 222, and 236) to storage volume byte offsets in the storage commands (238). The file system (210) can include queues (240) for handling the storage commands and processing guides (238). For example, the file system (210) may include a separate queue (or multiple queues) for each logical storage environment (212 and 232), as well as a separate file system cache (242) (or multiple caches) for each logical storage environment (212 and 232). Thus, the commands and guides (238) that came from calls (216 and 222) from the applications (214 and 220) in the first logical storage environment (212) can be interleaved and reordered together in one file system queue (240). The commands and processing guides (238) that came from calls (236) from the third application (234) in the second logical storage environment (212) can be kept separate because it is the only application running in that logical storage environment (212). However, the order of the commands and processing guides (238) that came from calls (236) from the third application (234) may be changed as the commands and processing guides are handled by the file system (210).

A volume manager (not shown) can take storage volume offsets from the commands (238) and can calculate device addresses (sector addresses, logical block addresses, etc.) using corresponding partition offsets. The file system (210) and volume manager together can generate device commands and processing guides (248) at the request of application function calls (216, 222, and 236), and those device commands and processing guides (248) can include packed commands, as well as storage processing guides.

The volume manager and the file system (210), including the queues (240) and caches (242), can generally operate in standard ways, except that the volume manager and file system (210) can be configured to create and/or translate packed commands and processing guides. Also, it may be desirable for the queues (240) and caches (242) to be configured to handle packed commands and processing guides in appropriate ways, such as by honoring processing guides such as write barriers (by not reordering commands in a stream around write barriers for that stream).

The device storage commands and processing guides (248) can be passed from the volume manager down to storage drivers (250). Because both logical storage environments (212 and 232) are mapped to a single storage device in this example (i.e., a single storage device is operating as the physical backing for both logical storage environments or volumes (212 and 232)), the storage commands and processing guides (248) from calls (216, 222, and 236) sent by all three applications (214, 220, and 234) can be interleaved and reordered by the storage drivers (250) in storage driver queues (252). The storage drivers (250) and storage driver queues (252) can operate in standard ways, except that the storage drivers (250) and storage driver queues (252) can be configured to appropriately handle packed storage commands and storage processing guides in appropriate ways (e.g., by not reordering commands in a stream around write barriers for that stream).

The storage drivers (250) can pass the device storage commands and processing guides (248) to a storage device (260), such as by passing the storage commands and processing guides (248) across a storage bus (not shown). The storage device (260) can operate as a physical backing store for the logical storage environments (212 and 232). However, in other configurations, a virtual storage device that includes multiple physical devices could operate as a physical backing store for a single logical storage environment, and the volume storage commands and processing guides (238) could be appropriately transformed as needed before passing the resulting device storage commands and processing guides (248) to the appropriate physical device(s).

The storage device (260) can include one or more queues, buffers, and/or caches, such as a queue and internal cache (262). The command queue and cache (262) can be controlled by a processor such as standard storage device controller (264). The controller (264) can also execute firmware instructions to appropriately pass commands and guides through the queue and cache (262), and to process the commands according to standard practices and according to the processing guides, as will be discussed more below. The controller (264) can also control the storage of information on storage media (266), such as solid state media or magnetic storage media such as hard disk drives.

B. Packed Storage Commands

Figure 3:
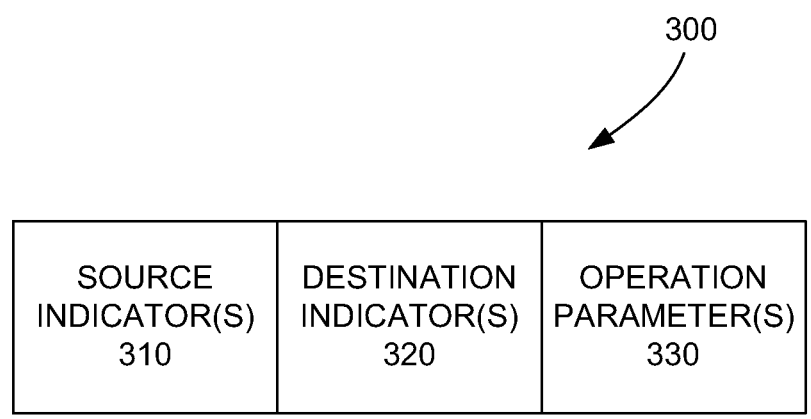
FIG. 3 is a block diagram of a packed storage command.

Referring to FIG. 3 and still to FIG. 2, packed storage commands (300) will be discussed. As illustrated in FIG. 3, a packed storage command (300) can include one or more data source indicators (310) and one or more data destination indicators (320), as well as one or more operation parameters (330), such as parameters that identify an operation (copy, move, soft link, etc.) to be performed on the data. Thus, any of multiple different data storage operations that can be described in terms of one or more data source data locations, one or more data destination data locations, and one or more parameters may be advantageously requested in a packed command, rather than a series of individual storage commands for the individual hardware media operations. For example, a standard application programming interface between one or more applications (214, 220, and 234) and the file system (210) can allow the applications (214, 220, and 234) to represent the desired source data location(s), destination data location(s), and parameter(s) in application programming interface calls to the file system (210). Likewise, interfaces between other components in the storage environment (200) can allow the packed commands to be transmitted along with other commands and processing guides (238 and 248).

The use of packed commands may be particularly beneficial for solid state devices because solid state devices traditionally use storage map tables, and solid state devices typically do not write data in-place. In storage map tables, logical addresses, such as logical block addresses, are typically linked to physical addresses where data is stored in the storage media. For example, if data is to be modified, it is often written in a new storage area in the solid state storage media, and the storage map table is updated to link a logical address for the data to the physical address for the new storage area. Many other types of storage devices, such as hard drives, may also use storage map tables, which can make efficient use of packed commands. Because logical addresses used outside storage devices with storage map tables need not correspond directly to the physical addresses within the storage devices, part or all of many storage operations can be performed using storage map tables, without making multiple round trips with information across a storage bus.

For example, if a packed move command (300) is sent to the storage device (260), the move operation can be performed by including an additional map table entry that links the destination indicator (such as a logical block address) with the physical address that was linked with the source indicator (such as a logical block address). Because the entire packed command can be sent to the storage device, no read or write data commands or read or write data operations within the storage device need to be performed. One example where such move operations can be used is with defragmenting a file. For example, a drive may be able to defragment its logical fragments of a file within its storage map table without performing data reads or writes—by merely moving entries within the storage map table.

Another example of a beneficial type of packed command is a soft link command, where two entries in a storage map table can point to the same physical data location. If a packed soft link command (300) is sent to the storage device (260), the soft link operation can be performed by including an additional storage map table entry that links the destination indicator (such as a logical block address) with the physical address that was originally linked with the source indicator (such as a logical block address), but without invalidating the original entry that linked the physical address with the source indicator. Such a storage map table update can be considered to create a soft link copy of the data which would have to be properly updated in a storage map table on a copy on write of either version of the data. As discussed above, writes typically are not done in-place on a solid state storage device, so the copy on write can be done with no more overhead than a single write operation—by writing the modified data to a new physical location and linking the logical address for the modified data with the physical address for the new physical location.

Another example of a beneficial type of packed command is a copy command, which may be performed, for example, where data is copied across partitions in a partitioned drive. If a packed copy command (300) is sent to the storage device (260), the copy operation can be performed by writing data to which a source indicator (310) is linked to a physical location with a new physical address, and including an additional storage map table entry that links the destination indicator (320) (such as a logical block address) with the new physical address. This can be done without passing the data across a storage bus if the physical addresses corresponding to the source indicator (310) and the destination indicator (320) are both in the same drive. Additionally, this would be no more expensive than a single write operation for the physical drive.

Other examples of packed commands that could be used include compression, encryption, and RAID p (and q) calculations. However, each of these would include some standard compression, encryption, and RAID calculations in addition to writing and storage map table update operations discussed above. Such calculations may be performed by some storage devices that are configured for such calculations, such as storage devices that are configured to perform encryption calculations.

C. Storage Command Streams

Figure 4:
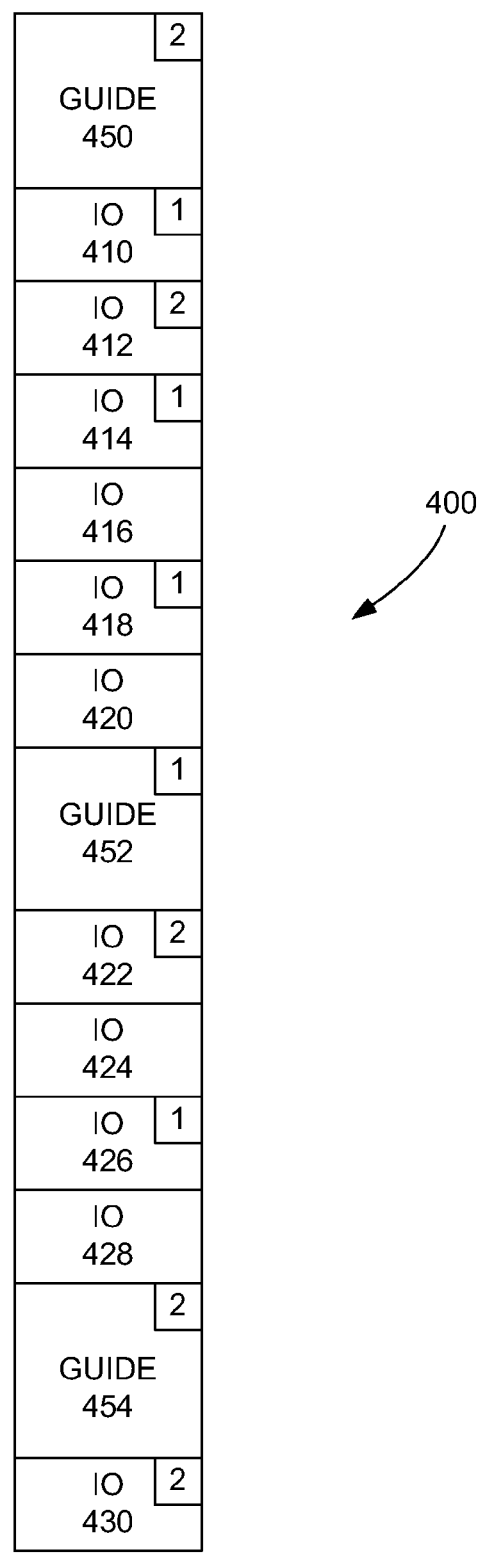
FIG. 4 is a block diagram of a set of storage commands and processing guides.

Referring now to FIGS. 2 and 4, storage command streams will be discussed. FIG. 4 illustrates a set of storage commands (400) interleaved with guides similar to the storage commands and processing guides (216, 222, and 236) being sent to the storage device (260) of FIG. 2. As noted above, a stream is a subset within a set of issued storage commands, and processing guides can be used to request that storage commands in a stream be processed in a desired way. This can be done with corresponding stream indicators in the processing guides and the storage commands. Commands may include multiple stream indicators, so that the commands belong to multiple streams. Also, guides may include multiple stream indicators so that they apply to the processing of multiple streams. However, for the sake of simplicity and brevity, FIG. 4 will be discussed with reference to commands and guides each having either a single stream indicator or no stream indicators. The set of storage commands (400) can include a first stream that includes all the commands (410, 414, 418, and 426) in the set of issued commands (400) that include a first stream indicator (1). For example, the indicator (1) may be included in command parameters that communicated the commands (410, 414, 418, and 426) to the storage device. Additionally, a processing guide (452) can include a stream indicator (1), which indicates that the processing guide applies to commands (410, 414, 418, and/or 426) in the first stream, if any, that meet its criteria. For example, the stream indicators may be a particular number corresponding to a particular stream. For example, if in the illustration of FIG. 4, the commands and guides arrived at a storage device in order from top to bottom, the guide (452) may apply to all commands (410, 414, and 418) that precede the guide (452) and are not yet completed, or to all commands that follow the guide (452) until some point, such as the appearance of another corresponding guide.

The set of issued commands (400) can also include a second stream that includes a subset of commands (412, 422, and 430) that each include a second stream indicator (2). In addition, a pair of processing guides (450 and 454) can include second stream indicators (2), indicating that those processing guides (450 and 454) are requesting specified processing of commands in the second stream that meet specified criteria. For example, one guide (450) may be a start guide and the other guide (454) may be an end guide, indicating that the guides apply to all commands (412 and 422) in the second stream between those two guides (450 and 454).

Some commands (416, 420, 424, and 428) may not include stream indicators, and may not be part of a stream, even though they are interleaved within the stream commands in the command set (400).

Using the processing guides and corresponding stream indicators, a subset of issued storage commands can be identified and the dependencies and order limitations between just these storage commands can be specified. This can allow applications and storage subsystem software to operate on subsets of storage operations without having to fight the race conditions and windows of risk associated with keeping track of which operations are still outstanding to a storage device at any given time. This can be done without knowing ahead of time all the commands that will be in a particular stream, and without prohibiting commands outside the stream from being interleaved with commands that are part of the stream.

Streams and associated processing guides can be particularly beneficial for operations in solid state storage devices because of the use of storage map tables in such devices and because such devices typically do not update data in-place. As will be seen, streams and processing guides can be useful in implementing atomic transactions, targeted flush operations, and write barriers.

Atomic transactions (transactions that are finalized all together or not at all) can be performed by a solid state device with little effort, as long as the device knows which storage commands are requesting operations that are to be committed atomically before the commands arrive. The commands to be included in an atomic transaction can be identified to a storage device by bookending a slice of the stream with guides indicating the beginning of a series to be atomically committed, and another guide indicating the end of that series. Computing components at all levels of the computing system can keep the slice of the stream between the bookending guides so that the commands for the atomic transaction will still be between the bookending guides when they reach the storage device. For example, in FIG. 4, the first guide (450) for stream 2 can indicate the beginning of a series of commands (412 and 422) to be atomically committed, and the second guide (454) for stream 2 can indicate the end of that series. A storage device with a storage map table may performs writes (which could be sole write commands, packed copy commands where data is to be written, etc.) for those commands as it receives them, but wait to update the storage map table until the last write is made permanent. At that time, the storage device can update all relevant entries in the storage map table together, performing the atomic commit. If power is lost before the last of the write operations and the storage map table update occurs, then the new data may be lost, but the old data, which was never overwritten, can be continued to be used.

For targeted flush commands, pending write operations (including uncommitted data in the write cache or queue) that match this operator's indicator are made permanent (i.e., they are flushed to permanent storage). Because the targeted flush command only applies to pending writes in the identified stream (rather than all pending writes), the targeted flush can decrease the performance impact of flush operations, as existing flush commands that apply to all pending writes. For example, an application can request that only its data be flushed (rather than requesting that all data from all applications be flushed) by including stream indicators for a particular stream in all its storage commands, and then sending a targeted flush processing guide that indicates the same stream.

For write barrier guides, when the data in the stream is made permanent no write operations are reordered around the write barrier guides. This limitation on reordering can be honored by all the computing components that receive the write barrier guides, including file system components, device drivers, and storage devices themselves. Thus, for example, referring to FIG. 4, if the guide (452) for the first stream is a write barrier, then all the storage commands (410, 414, and 418) in the stream that precede the associated guide (452) are made permanent before any of the commands (426) that follow the guide (452). An application can include a checkpoint after a write barrier. If the checkpoint is made permanent on disk, then the application can be assured that the storage commands up to the write barrier were processed and made permanent, even if a failure such as a power loss has occurred.

Streams can be particularly helpful when seeking to perform ACID (Atomic, Consistent, Isolated, and Durable) operations. For example, atomic transaction stream processing guides can help perform "atomic" operations, write barrier stream processing guides can help perform "consistent" operations, and targeted flush stream processing guides can help perform "durable" operations. Other types of guides may also be helpful in specifying processing for streams of storage commands.

III. Packed Storage Commands and Storage Command Stream Techniques

Figure 5:
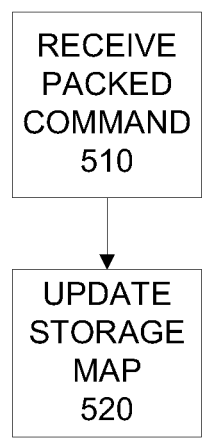
FIG. 5 is a flow diagram of a packed storage command technique.

Referring to FIG. 5, a packed storage command technique will be discussed. This technique and the others discussed below can be performed in computing and storage environments such as those discussed above, or in some other computing environment. In the technique, a packed command can be received (510) at a storage device, such as a solid state storage device. The packed command can include an indicator of a source data location in the storage device and an indicator of a destination data location in the storage device. For example, the source and destination indicators can each be an indicator of one or more logical block addresses. In response to receiving the packed command at the storage device, a storage map table in the storage device can be updated (520).

In addition to the source and destination indicators, the packed command may also include an operation parameter. For example, the operation parameter may indicate a soft link operation, and the storage map table can be updated (520) to include multiple valid storage map table entries linking to the same set of data. As another example, the operation parameter may indicate a move operation, and the storage map table can be updated (520) by invalidating a link between the indicator of the source data location and a set of data, and committing a link between the indicator of the destination data location and the set of data. As yet another example, the operation parameter can indicate a copy operation, and the storage map table can be updated (520) by writing data from an existing storage location linked with the indicator of the source data location to a new storage location, and committing a new link between the indicator of the destination data location and the new storage location.

Figure 6:
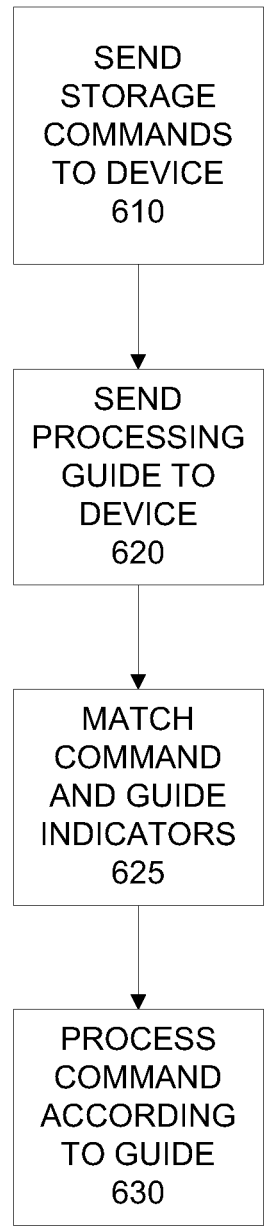
FIG. 6 is a flow diagram of a storage command stream technique.

Referring to FIG. 6, a storage command stream technique will be discussed. In the technique, a set of storage commands can be sent (620) to a storage device. One or more of the commands in the set can each include a stream indicator that identifies the command with a stream. A processing guide can also be sent (610) to the storage device. The processing guide can include a stream indicator associating the processing guide with a storage command stream. Additionally, the stream indicator in each of the one or more commands can be matched (625) with the stream indicator in the guide at the storage device. Additionally, the one or more commands can be processed (630) according to the guide. The processing guide can be one of various guides, such as an atomic transaction processing guide, a targeted flush processing guide, or a write barrier processing guide. The set of storage commands can include one or more packed commands, which can each include an indicator of a source data location in the storage device and an indicator of a destination data location in the storage device.

Another processing guide can be sent to the storage device, and that processing guide can include a stream indicator associating the processing guide with the stream. Thus, multiple processing guides can be sent to dictate the processing of a single stream. For example, a targeted flush processing guide and a write barrier processing guide could both identify the same stream (although they may not apply to the processing of the same commands within that stream). Also, one or more commands in the set of commands can each include an additional stream indicator associating the command with a second stream. Another processing guide can be sent to the storage device, and that processing guide can include a stream indicator associating the processing guide with the second stream.

Figure 7:
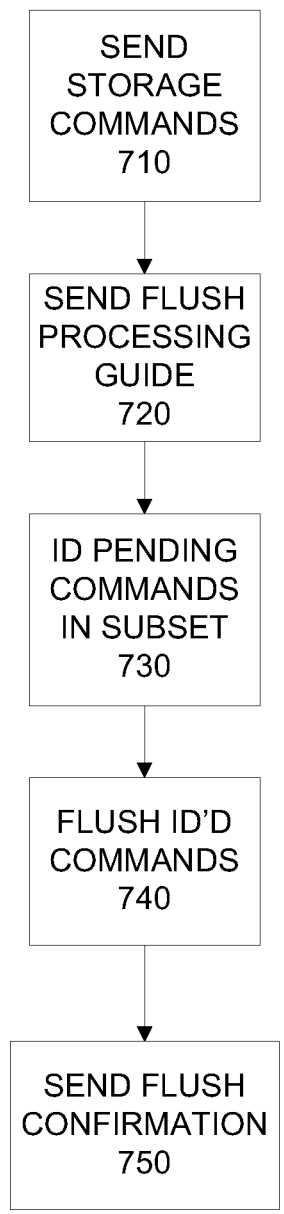
FIG. 7 is a flow diagram of a targeted flush technique.

Referring now to FIG. 7, a targeted flush technique will be discussed. In the technique, a set of storage commands can be sent (710) to a storage device. A flush processing guide can also be sent (720) to the storage device, where the flush processing guide identifies a subset of the storage commands to be flushed to permanent storage. The flush processing guide and the storage commands in the subset can each include a stream indicator that identifies the stream. In response to the flush command, the technique can also include identifying (730) pending storage commands of the subset and flushing (740) the identified commands to permanent storage. Moreover, a confirmation that the targeted flush is complete can be sent (750) after flushing the identified commands to permanent storage. For example, the confirmation can be sent to an application that sent (720) the flush processing guide.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable hardware storage media having computer-executable instructions embodied thereon that, when executed by at least one processor, cause the at least one processor to perform acts comprising:
    sending a processing guide to a storage device, the processing guide including a stream indicator associating the processing guide with a first storage command stream; and
    sending a set of storage commands to the storage device, a subset of one or more of the commands in the set of commands each including a stream indicator that matches the stream indicator in the processing guide and identifies the command with the first stream, at least one command in the subset including a first stream indicator and a second stream indicator, the first stream indicator being the stream indicator that identifies the at least one command with the first stream, the first stream indicator also indicating the at least one command belongs to the first stream, and the second stream indicator identifying the at least one command with a second storage command stream and indicating the at least one command belongs to the second stream.

2. The one or more computer-readable hardware storage media of claim 1, wherein the acts further comprise, at the storage device:
matching the stream indicator in each of the one or more commands in the subset with the stream indicator in the guide; and
processing the one or more commands in the subset according to the guide.

3. The one or more computer-readable hardware storage media of claim 1, wherein the processing guide comprises an atomic transaction processing guide.

4. The one or more computer-readable hardware storage media of claim 1, wherein the processing guide comprises a targeted flush processing guide, the targeted flush processing guide comprising instructions to perform a targeted flush of one or more pending data write commands in the first stream to permanent storage in the storage device.

5. The one or more computer-readable hardware storage media of claim 1, wherein the processing guide comprises a write barrier processing guide.

6. The one or more computer-readable hardware storage media of claim 1, wherein the set of storage commands comprises one or more packed commands, the one or more packed commands each comprising an indicator of a source data location in the storage device and an indicator of a destination data location in the storage device.

7. The one or more computer-readable hardware storage media of claim 1, wherein the processing guide is a first processing guide, and wherein the acts further comprise sending a second processing guide to the storage device, the second processing guide including a stream indicator associating the second processing guide with the second stream, the first processing guide and the second processing guide both applying to the at least one command that is indicated to belong to the first stream and the second stream.

8. The one or more computer-readable hardware storage media of claim 1, wherein the processing guide is a first processing guide, and wherein the acts further comprise sending a second processing guide to the storage device, the second processing guide including a stream indicator associating the second processing guide with the first stream.

9. The one or more computer-readable hardware storage media of claim 1, wherein:
the acts further comprise processing the one or more commands identified with the first stream according to the guide; and
the guide is selected from a group consisting of an atomic transaction processing guide, a targeted flush processing guide, and a write barrier processing guide.

10. A computer-implemented method comprising:
sending a processing guide to a storage device, the processing guide including a stream indicator associating the processing guide with a first storage command stream; and
sending a set of storage commands to the storage device, a subset of one or more of the commands in the set of commands each including a stream indicator that matches the stream indicator in the processing guide and identifies the command with the first stream, at least one command in the subset including a first stream indicator and a second stream indicator, the first stream indicator indicating the at least one command belongs to the first stream and the second stream indicator indicating the at least one command belongs to a second storage command stream.

11. The computer-implemented method of claim 10, further comprising:
the storage device matching the stream indicator in each of the one or more commands in the subset with the stream indicator in the guide; and
the storage device processing the one or more commands in the subset according to the guide.

12. The computer-implemented method of claim 10, wherein the processing guide is a first processing guide, and wherein the method further comprises sending a second processing guide to the storage device, the second processing guide including a stream indicator associating the second processing guide with the second stream, the first processing guide and the second processing guide both applying to the at least one command that is indicated to belong to the first stream and the second stream.

13. The computer-implemented method of claim 10, wherein the processing guide comprises an atomic transaction processing guide.

14. The computer-implemented method of claim 10, wherein the set of storage commands is a set of write operations requesting information to be written to the storage device.

15. A computer system comprising:
at least one processor; and
a memory comprising instructions stored thereon that when executed by the at least one processor cause the at least one processor to perform acts comprising:
sending a set of storage commands to a storage device, a subset of one or more of the commands in the set of commands each including a stream indicator that identifies the command with a storage command stream;
sending a first processing guide to the storage device, the first processing guide being different from each of the one or more commands in the subset, and the first processing guide including a stream indicator that matches the stream indicator in each of the one or more commands in the subset and that associates the first processing guide with the stream; and
sending a second processing guide to the storage device, the second processing guide including a stream indicator that matches the stream indicator in each of the one or more commands in the subset and that associates the second processing guide with the stream, the second processing guide being different from the first processing guide and different from each of the one or more commands in the subset.

16. The computer system of claim 15, wherein the stream is a first stream, and wherein at least one command in the subset includes multiple stream indicators, the multiple stream indicators including the stream indicator associating the at least one command with the first stream, the stream indicator associating the at least one command with the first stream also indicating the at least one command belongs to the first stream, and the multiple stream indicators including another stream indicator associating the at least one command with a second stream and indicating the at least one command belongs to the second stream.

17. The computer system of claim 16, wherein the acts further comprise sending a third processing guide to the storage device, the third processing guide including a stream indicator associating the third processing guide with the second stream, the first processing guide and the third processing guide both applying to the at least one command that is indicated to belong to the first stream and the second stream.

18. The computer system of claim 15, wherein the acts further comprise, at the storage device:
matching the stream indicator in each of the one or more commands in the subset with the stream indicator in the first processing guide; and
processing the one or more commands in the subset according to the first processing guide.

19. The computer system of claim 15, wherein the first processing guide comprises a targeted flush processing guide, the targeted flush processing guide comprising instructions to perform a targeted flush of one or more pending data write commands in the stream to permanent storage in the storage device.

20. The computer system of claim 15, wherein the first processing guide is selected from a group consisting of an atomic transaction processing guide, a targeted flush processing guide, and a write barrier processing guide.

* * * * *